(No Model.) 3 Sheets—Sheet 1.

A. GILMORE.
SEEDER.

No. 315,931. Patented Apr. 14, 1885.

Witnesses.
L. H. Marshall
J. S. Barker

Inventor.
Albert Gilmore
by Doubleday & Blinn (No Model.) 3 Sheets—Sheet 2.
A. GILMORE.
SEEDER.
No. 315,931. Patented Apr. 14, 1885.
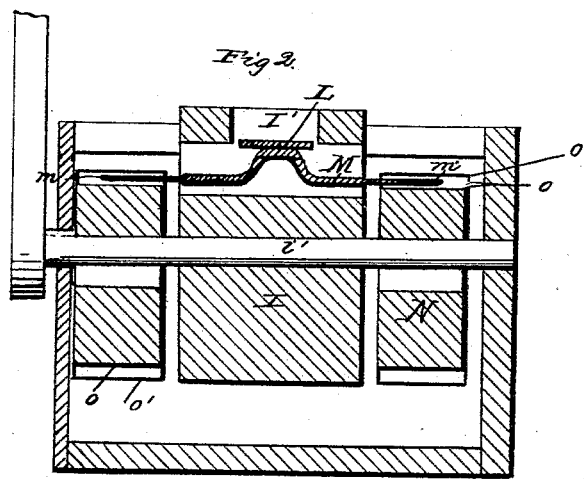
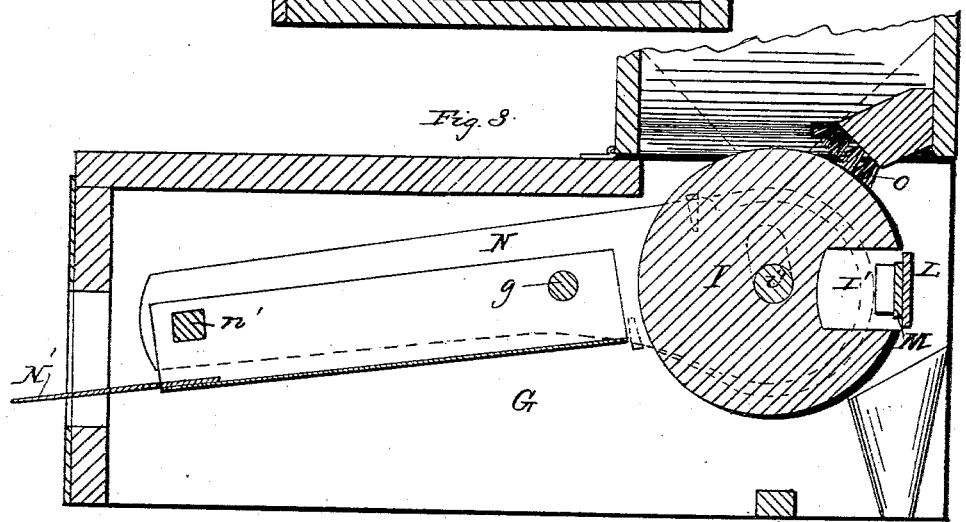
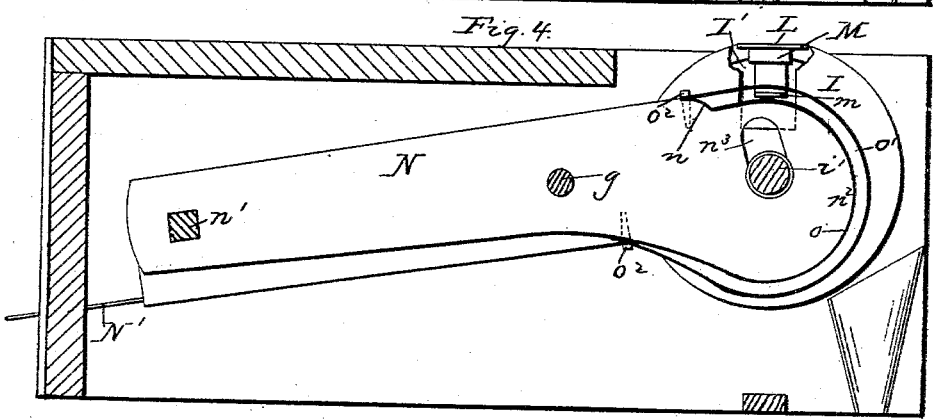
Witnesses.
L. H. Marshall
J. S. Barker
Inventor.
Albert Gilmore
Doubleday & Bliss attys.

(No Model.) 3 Sheets—Sheet 3.
A. GILMORE.
SEEDER.
No. 315,931. Patented Apr. 14, 1885.
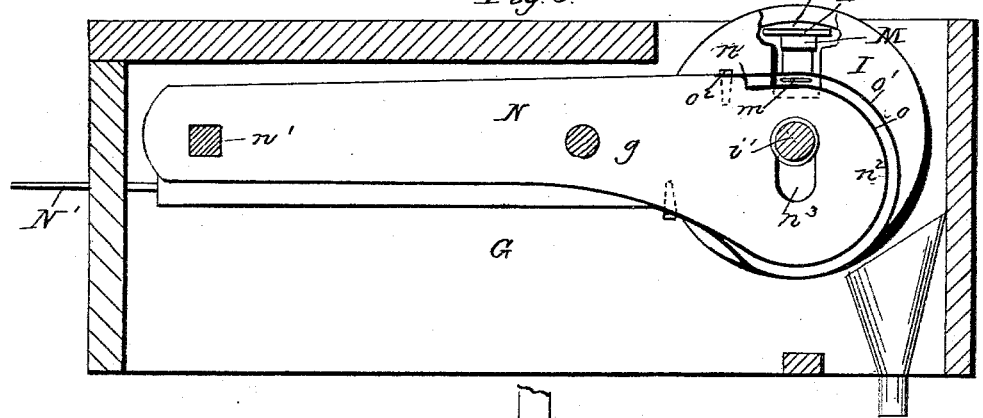
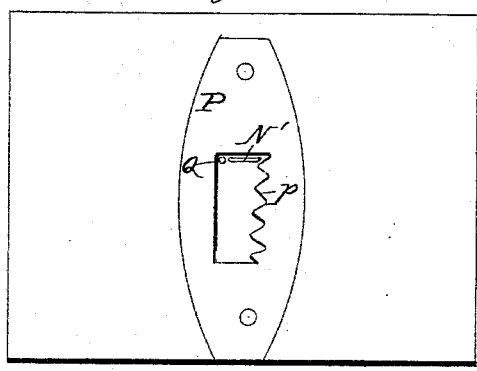
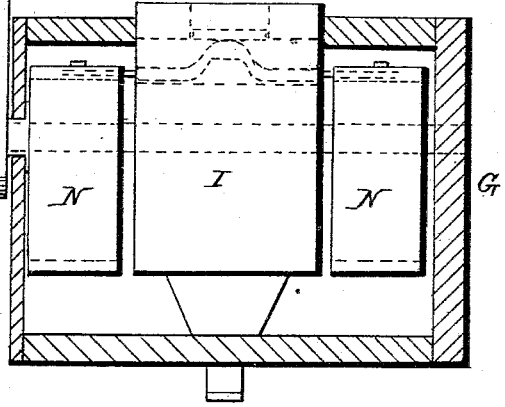
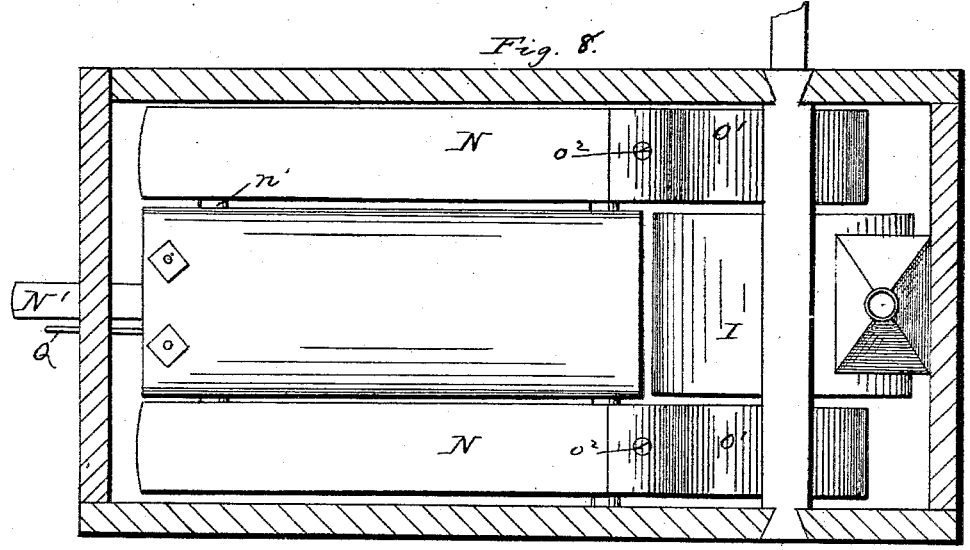

UNITED STATES PATENT OFFICE.

ALBERT GILMORE, OF GILMORE, OHIO.

SEEDER.

SPECIFICATION forming part of Letters Patent No. 315,931, dated April 14, 1885.

Application filed May 21, 1884. (No model.)

*To all whom it may concern:*

Be it known that I, ALBERT GILMORE, a citizen of the United States, residing at Gilmore, in the county of Tuscarawas and State of Ohio, have invented certain new and useful Improvements in Seeders, of which the following is a specification, reference being had therein to the accompanying drawings.

Figure 1:
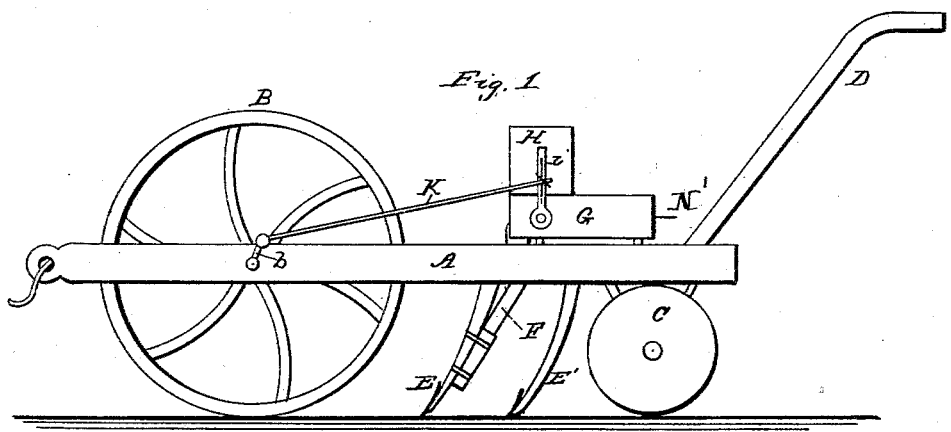
Figure 9:
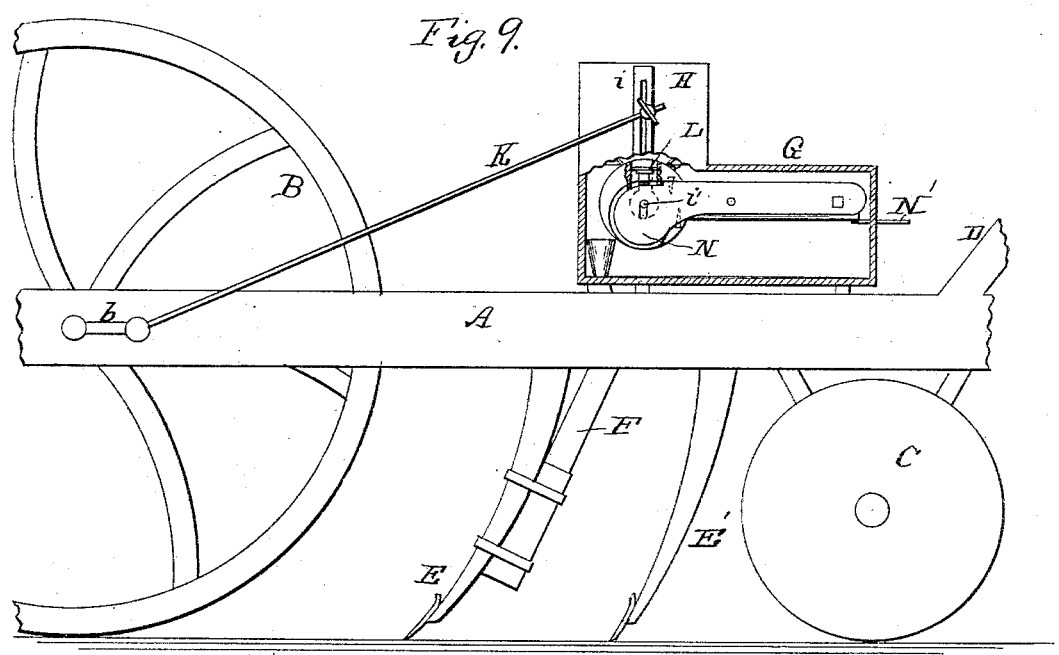

Figure 1 is a side view of my improved seeding-machine. Fig. 2 is a section through the dropping-wheel. Fig. 3 is a central longitudinal section through the box which covers the seed-dropping mechanism. Figs. 4 and 5 show the seed-dropping mechanism in different positions, one of the outer walls of the box or casing being removed. Fig. 6 is a front end view of the same. Fig. 7 is a face view of the rear wall of the box or casing. Fig. 8 is a top view of the seed-dropping mechanism, the top wall of the box or casing being removed. Fig. 9 is a side view, (a portion of the seeder-casing being broken away,) it showing the relations of the working parts to each other.

My invention relates to a novel mechanism for dropping seed, whereby the amount of grain dropped into each drill may be varied at pleasure or the delivery entirely stopped.

I have shown my invention applied to a planter by which the operator walks; but it may be applied to seeders of other construction.

In the drawings, A is the frame of the seeder, to which are attached the handles D; B, the ground or drive wheel, and C the roller or covering-wheel.

E represents the shovel, which opens the earth for the reception of the seed, which is conveyed to the ground through the tube F; and E' represents the covering-shovel.

G is a box or case mounted on the frame A, which covers or protects the mechanism for regulating the amount of seed dropped, which mechanism will be described hereinafter.

Upon this box G is mounted the seed-hopper H, in the bottom of which oscillates the dropping cylinder or wheel I.

Upon the axis of ground-wheel B is a short crank, $b$, which is connected by a link, K, with a longer crank, $i$, upon the rocking bar or axis $i'$ of the dropping-cylinder I, which causes the dropping-cylinder to be oscillated at each revolution of the ground-wheel. The extent of oscillation may be regulated by changing the relative lengths of the two cranks $b$ and $i$, the crank $i$ being shown provided with a slot to permit this; or the number of oscillations at each revolution of wheel B may be varied by the use of gear-wheels or sprocket-wheels and chains, as is common in this class of machines.

I' is a recess formed in cylinder I, which constitutes a pocket for the grain which is to be dropped. The seed-recess I' is so situated in the periphery of the dropping-cylinder that when the crank $b$ on the ground-wheel is at the rearward limit of its throw it will be directly below the center of the hopper in position to be filled with seed, while as the crank revolves the cylinder will be oscillated until, when the crank arrives at the forward limit of its throw, the recess will be over the tube, into which the grain will fall after it is forced from its pocket, as will be described. In this seed-recess works a plunger, L, secured to a cross-bar, M, which slides in a radial slot extending through the cylinder I. The ends $m$ $m$ of the cross-bar project a short distance from the ends of the dropping-cylinder to engage with cams which operate the cross-bar and plunger.

N N are bars or levers pivoted at $g$ to the box or case G, and connected by one or more cross-bars, $n'$, to which is attached a handle, N', for rocking the levers about the pivots $g$. The forward ends of bars N are preferably rounded upon their outer faces to form cams $n^2$, upon which travel the projecting ends $m$ of the cross-bar carrying the plunger L, there being shoulders $n$ upon the upper face of these bars a little in rear of rocking bar $i'$. As shown, the end $n^2$ of each bar N is faced with a metal strip, $o$, while another strip, $o'$, lies outside of this strip $o$, to act as a guide for the ends of cross-bar M. These metal strips are secured to the main portions of the levers by screws or pins $o^2$; or, if preferred, these strips may be dispensed with, and castings fitting over the ends $n^2$ of levers N and having a groove in which arms $m$ travel may be employed. The cams $n^2$ are so shaped that the plunger will be retracted or drawn to the lower part of the seed-recess I' when the recess is under the seed-hopper and the crank on ground-wheel is at the rearward limit of its throw. As the ground-wheel revolves, the dropping-cylinder is rocked on its axis, all superfluous seed being removed from the recess by the brush O, the plunger L in the meantime being thrust outward by the action of the cams on the cross-bars until, when the crank $b$ is at the forward limit of its throw, it (the plunger) is pushed out even with the face of the cylinder, the operation causing the discharge of the seed into the tube F. The bars N are at their forward ends slotted at $n^3$, through which slots passes the rocking bar $i'$ of the cylinder I, these slots permitting the bars N to be rocked about their pivots without interference from the cylinder-axis.

When it is desired that no grain shall be dropped—as when turning the seeder—the handle N' is depressed, which results in elevating the forward ends of bars or levers N, and as the cross-bar M is carried thereby, by reason of the engagement with the cams on the bars N, the plunger is raised in the recess I' until even with the face of the cylinder, when no seed will be taken into the recess I', and hence none will be delivered to the tube by the oscillation of the dropping-cylinder. By securing the handle N' intermediately between its highest and lowest points the plunger will be more or less withdrawn into the recess in the dropping-cylinder during the backward rocking of the cylinder, from which fact it will be readily seen the amount of seed discharged may be very accurately governed. The cams are of such form that they insure the plunger shall be pushed out even with the face of the cylinder when the seed pocket or recess I' is opposite the tube, whatever be the position of the handle N' of lever N, thus effecting a positive delivery of seed at each oscillation.

In the rear wall of the casing G, I attach a plate, P, containing a slot, through which the handle N' passes. At one edge of the slot are a series of notches, $p$, into which the handle N' is forced by a spring, Q, bearing against the opposite side of the plate. By means of these notches the handle may be secured in various vertical positions, which will determine the position of the levers N and cams $n^2$, and consequently the amount of seed delivered.

If desired, the casing G may be dispensed with, bearings for the pivots $g$ and rock-bar $i'$ and a series of catches or stops for the handle being thus supported upon the frame A.

Fertilizers may be mixed with the grain and placed in the hopper without fear of clogging the dropping mechanism, as the plunger will insure that recess I' shall be freed from whatever it may contain at each oscillation of the cylinder.

By my device the amount of grain delivered can be easily and accurately governed by the operator, while the delivery can be absolutely prevented, when desired, by simply lowering and securing the handle N'.

I am aware of the fact that use has heretofore been made of a continuously-revolving wheel provided with a series of chambers or pockets, which in turn pass below the hopper, and each of which is provided with a plunger, in combination with a grooved plate, in the groove of which fit lugs respectively carried by the plungers for effecting the movements of the latter, and I do not claim, broadly, such means for receiving the material, or a reciprocating plunger, broadly, for forcing the material out; but in my construction there are numerous advantages over that above alluded to. By reciprocating the cylinder shown I avoid the necessity of forming a large number of recesses, and require but a fraction of a rotation thereof to carry the receiving-socket from its uppermost point to the point of delivery. Moreover, by means of devices substantially such as I have shown, I can instantly so adjust the parts that the feed thereof shall be immediately stopped or so that the dropping shall be continued. The grooved plates which have been heretofore used have been held in place by means of set screws or nuts, which could not be loosened so as to permit the adjustment of the guides instantly, as can be done in my machine.

Inasmuch as the cylinder reciprocates through but a portion of the circle, I can combine with it cam-guides of substantially the character shown (by which the dropping mechanism shall be thrown into or out of action) much more readily than if the cylinder rotated continuously.

What I claim is—

1. In a seeder, the combination, with the oscillating cylinder provided with the seed-socket, of the movable plunger, the bar supporting the plunger, the adjustable cams, and means, substantially as described, whereby the operator can, from the outside, immediately adjust the cams, substantially as set forth.

2. In a seeder, the combination of the oscillating cylinder provided with the seed-socket, the movable plunger, the bar supporting the plunger and projecting beyond the cylinder upon opposite sides, the vertically-adjustable cams, and means, substantially as described, projecting through the casing for carrying the cams, whereby they can be immediately adjusted, substantially as set forth.

3. In a seeder, the combination of the oscillating cylinder provided with the socket for the seed, the movable plunger, the adjustable cams, and the levers for supporting and adjusting the cams, substantially as set forth.

4. In a seeder, the combination of the cylinder provided with the seed-socket, the movable plunger, the bar supporting the plunger and having its ends projecting beyond the cylinder, the cams for actuating the bar, the crank of the oscillating cylinder, and the pitman connecting the crank with the ground-wheel, substantially as set forth.

5. In a seeder, the combination of the cylinder provided with a seed-socket, a movable plunger in said socket, one or more bars or projections carried by the plunger for operating it, and a cam or cams engaging with said bar or bars, and a hinge or axis for supporting the cam or cams and to permit the swing thereof, substantially as set forth.

6. In a seeder, the combination, with a cylinder provided with a seed-socket and a movable plunger, of a cam which engages with the said plunger, means, substantially as described, connected with said cam and extending to the outside of the casing to adjust the cam, and devices, substantially as set forth, for holding the adjusting devices in different positions, substantially as set forth.

7. In a seeder, the combination, with a cylinder provided with a seed-socket and a movable plunger, of a cam engaging with said plunger, formed with a groove or way bounded by two removable or separable metal strips, whereby, when worn, they may be replaced, substantially as set forth.

In testimony whereof I affix my signature in presence of two witnesses.

ALBERT GILMORE.

Witnesses:
T. D. HEALEA,
T. H. LOLLER.